United States Patent [19]

Castillo et al.

[11] Patent Number: 5,114,458
[45] Date of Patent: May 19, 1992

[54] FERTILIZERS HAVING A HIGH HARDNESS AND STORAGE STABILITY

[75] Inventors: Jose R. Castillo, Los Tequel; Marilu S. de Liendo, Los Teques, both of Venezuela

[73] Assignee: Intevep S.A., Venezuela

[21] Appl. No.: 669,639

[22] Filed: Mar. 14, 1991

Related U.S. Application Data

[63] Continuation-in-part of Ser. No. 625,006, Dec. 10, 1990, abandoned.

[51] Int. Cl.$^5$ ............................ C05C 9/00; C05F 7/02; C05F 7/04
[52] U.S. Cl. ............................................. 71/28; 71/61; 71/63; 71/64.13
[58] Field of Search ...................... 71/64.13, 28, 61, 63

[56] References Cited

U.S. PATENT DOCUMENTS 3,353,949  11/1967  Nau ..................................... 71/64.13

Primary Examiner—Ferris Lander
Attorney, Agent, or Firm—Bachman & LaPointe

[57] ABSTRACT

A fertilizer composition characterized by high mechanical resistance and anti-caking properties comprises a compound selected from the group consisting of urea, ammonium sulphate, nitrogen-potassium-phosphorus granulates, mono-ammonic phosphate, di-ammonic phosphate, potassium chloride and mixtures thereof admixed with a hydrosoluble lignate salt selected from the group consisting of sodium lignates, alkaline metal lignates, ammonium lignates, and mixtures thereof in an amount of between 0.1 to 5.0 wt. % in the final fertilizer composition.

9 Claims, No Drawings

FERTILIZERS HAVING A HIGH HARDNESS AND STORAGE STABILITY

CROSS REFERENCE TO RELATED APPLICATION

This application is a Continuation-In-Part of application Ser. No. 625,006, filed Dec. 10, 1990 and now abandoned.

BACKGROUND OF THE INVENTION

The present invention is drawn to a method for producing a fertilizer composition and a fertilizer composition per se which is characterized by high mechanical resistance and anti-caking properties while maintaining a high capacity of dissolution.

Heretofore, one of the primary problems encountered when handling, transporting and storing fertilizers is the fact that the fertilizers tend to lump. In addition, known fertilizer compositions fail to have an acceptable degree of hardness or resistance to fracturing. It is common in the prior art to provide additives to the fertilizer which alter the manner of crystallization of the fertilizer during the forming of the fertilizer into a final desired product U.S. Pat. Nos. 3,112,343, 4,160,782 and 4,204,053 disclose various processes for the treatment of fertilizers with additives such as formaldehyde in an effort to eliminate the problems as aforesaid. Formaldehyde has been designated by the U.S Environmental Protection Agency as a toxic chemical and a potentially carcinogenic substance. Accordingly, alternate additives have been employed in fertilizers in an attempt to reduce the fragility of the fertilizer and its tendency to lump. U.S. Pat. No. 4,587,358 discloses a fertilizer composition which employs lignosulphonates as an additive to improve the foregoing properties. U.S. Pat. Nos. 4,743,289 and 4,846,871 likewise disclose improved fertilizer compositions employing additives which tend to increase the mechanical resistance of the fertilizer as well as the anti-caking properties thereof.

Naturally, it would be highly desirable to provide a fertilizer composition and method for making same which is characterized by high mechanical resistance and anti-caking properties while at the same time being non-toxic, non-carcinogenic and relatively inexpensive to manufacture.

Accordingly, it is a principal object of the present invention to provide an improved fertilizer composition and method for making same wherein the fertilizer is characterized by high mechanical resistance and anti-caking properties.

It is a particular object of the present invention to provide a fertilizer as aforesaid which includes an additive in the form of a hydrosoluble lignate salt.

It is a still further object of the present invention to provide a fertilizer and method as aforesaid which employs a hydrosoluble lignate salt as an additive wherein the lignate salt is derived from waste materials developed in paper pulp factories.

It is a another still further object of the present invention to provide a fertilizer and method as aforesaid which is inexpensive, non-toxic and non-carcinogenic.

Further objects and advantages of the present invention will appear hereinbelow.

SUMMARY OF THE INVENTION

In accordance with the present invention, the foregoing objects and advantages are readily obtained.

The present invention is drawn to a fertilizer composition and a method of making same wherein the fertilizer is characterized by a high degree of mechanical resistance and anti-caking properties. In accordance with the present invention, the fertilizer composition comprises a compound selected from the group consisting of urea, ammonium sulphate, nitrogen-potassium-phosphorus granulates, mono-ammonic phosphate, di-ammonic phosphate, potassium chloride and mixtures thereof and a hydrosoluble lignate salt selected from the group consisting of sodium lignates, alkaline metal lignates, ammonium lignates, and mixtures thereof in an amount of between 0.1 to 5.0 wt. % in the final fertilizer composition such that said fertilizer formula possesses a high mechanical resistance and a low tendency to lumping without affecting the capacity of dissolution thereof. In accordance with a preferred embodiment of the present invention, the hydrosoluble lignate salt is a sulphur free sodium lignate which is derived from waste products from paper pulp factories. Preferred compounds for use in the fertilizer composition are urea, ammonium sulphate, potassium chloride, mono ammonium phosphate and diammonium phosphate with urea being a common nitrogen carrier. By employing an addition of a lignate salt, the resulting fertilizer is characterized by a greater resistance to compression and impact as well as a reduced tendency for lumping.

The method for producing the fertilizer of the present invention comprises mixing the compound and lignate salt so as to produce a homogeneous mixture thereof and thereafter heating the mixture in a furnace to a temperature of between 120° and 160° C. and thereafter processing the mixture so as to obtain a desired particulate material form. In accordance with the preferred embodiment of the method of the present invention, the sodium lignate results from processing paper pulp.

The fertilizer of the present invention and method for making same results in a non-toxic, non-carcinogenic fertilizer composition which is characterized by high mechanical resistance and good anti-caking properties.

DETAILED DESCRIPTION

A waste material produced in paper pulp factories referred to as "soda liquor" consists essentially of a solution of lignates. In the treatment step in the paper pulp factories, the raw materials are processed with sodium hydroxide which results in a "soda liquor" wherein the lignates are mainly sodium lignates.

In order to obtain the hydrosoluble lignate salt additive for use in the fertilizer composition of the present invention, the "soda liquor" is dewatered so as to produce a water solution having a concentration of the sodium lignate of between 48 and 55 wt. % or the water is totally eliminated so as to result in a water free lignate powder.

While sodium lignates are particularly suitable as additives in the fertilizer of the present invention, it should be appreciated that other lignates such as alkaline metal lignates and ammonium lignates can likewise be used. Furthermore, the lignates may contain other material such as polysaccharides and/or monosaccharides and/or salts from acids contained by the degradation of carbohydrates during the pulping operation. These may be present in the lignate without altering its properties relative to mechanical resistance and anticaking. In a preferred embodiment of the present invention, the lignate salt is derived from a raw material used in the paper pulp fabrication which is preferably sugar cane bagasse; however, other vegetable material can be used which contains at least 15 wt. % lignin.

In accordance with the method of the present invention, the hydrosoluble lignate salt is admixed with a compound selected from the group consisting of urea, ammonium sulphate, nitrogen-potassium-phosphorus granulates, mono-ammonic phosphate, di-ammonic phosphate, potassium chloride and mixtures thereof. As noted above, the hydrosoluble lignate salt is selected from the group consisting of alkaline metal lignates, ammonium lignates, and mixtures thereof in an amount of between 0.1 to 5.0 wt. % in the final fertilizer composition such that said fertilizer formula possesses a high mechanical resistance and a low tendency to lumping without affecting the capacity of dissolution thereof. In accordance with the present invention, the preferred hydrosoluble lignate salt is a sulphur free sodium lignate and the compound which it is mixed with is preferably urea. When urea is used as the compound, the lignate salt should be present in the final fertilizer composition from 0.1 to 1.0 wt. %. When ammonium sulphate is used as the compound, the hydrosoluble lignate salt is present in the final fertilizer composition in an amount of 2.6 to 4.8 wt. %.

In accordance with the present invention, the compound and the hydrosoluble lignate salt are mixed together so as to produce a homogenous mixture. The homogeneous mixture is thereafter heated to a temperature of from 120° to 160° C. and thereafter processes by the well known prilling into final particulate form.

As noted above, the lignate salt is obtained from waste products produced during the process of paper pulps and the raw material used in the processing is usually sugar cane bagasse.

The properties of the fertilizer of the composition are comparable to known fertilizer compositions and it will be demonstrated hereinbelow with regard to the examples. The hardness or mechanical resistance of the fertilizer has two components. The first component being the resistance to compression which is a static force and the second component being resistance to impact which is a dynamic force. The resistance to compression is determined in accordance with Chatillon Hardness Compression and employs a device manufactured by John Chatillon & Sons under Model No. LTCM-3 under International Fertilizer Development Center Standard S-115. The resistance to impact is determined under International Fertilizer Development Center Standard F-118. The tendency to lump is evaluated by means of accelerated caking tests. Such tests consist of placing a certain quantity of prills in the interior of a hollow cylinder and entrapping the prills between two plexiglass pistons. After an established amount of time, a small cake is obtained which is then subject to fracture. The force required to fracture the cake is determined with a penetrometer. The lower the force, the less caking has occurred.

The foregoing examples will demonstrate the quality of the fertilizer of the present invention when compared to known fertilizer compositions.

EXAMPLE I

A "soda liquor" having a total solids content of 8 wt. % was dewatered so as to obtain a solution having a solids content of 51 wt. %. The concentrated liquor was mixed with solid urea in two different batches so as to obtain a final product in Test 1 of 0.5 wt. % lignate salt and in Test 2 of 0.7 wt. % lignate salt. Each of the test fertilizers were thereafter mixed so as to obtain a homogeneous blend and thereafter the mixtures were melted in a furnace at a temperature of 140° C. Observation indicated that the lignates became very soluble in the melted urea and that the urea lignate solutions did not present any turbidity whatsoever. Thereafter the mixture was cooled and prilled in a known manner so as to obtain particles of various diameters. After pearling, the prills were screened to separate them by sizes into 10 mesh, 12 mesh and 14 mesh.

A further Test 3 fertilizer composition was produced by adding powdered lignate salt to urea so as to produce a final fertilizer composition of lignate salt of 0.5 wt. %. The mixture was thereafter blended so as to form a homogeneous mixture and heated and prilled and separated in the same manner of Tests 1 and 2. In order to demonstrate the behavior of the fertilizer compositions of the present invention, their resistance to compression was determined in accordance with Chatillon Hardness Compression and compared to two known fertilizer compositions containing urea and an additive and a fertilizer consisting solely of urea. The two known fertilizer compositions were as follows: UF-85$^R$, of Allied Chemicals (U.S.A.) and Norlig -HP$^R$, of Daishowa Chemicals (U.S.A.). The results of the compression tests are set forth below in Table I.

TABLE I

| ADDITIVE | QUANTITY OF ADDITIVE IN THE UREA wt. % | RESISTANCE TO COMPRESSION (Kg) (U.S. Standard Mesh) | | | AVERAGE INCREASE OF RESISTANCE TO COMPRESSION wt. % |
|---|---|---|---|---|---|
| | | MESH 10 | MESH 12 | MESH 14 | |
| NONE | WITHOUT ADDITIVE | 0.7 ± 0.14 | 0.56 ± 0.15 | 0.36 ± 0.11 | — |
| UF85 | 0.3 | 0.86 ± 0.21 | 0.69 ± 0.10 | 0.51 ± 0.14 | 29 |
| Norlig-HP | 0.5 | 0.92 ± 0.20 | 0.68 ± 0.12 | 0.48 ± 0.09 | 28 |
| Test I | 0.5 Lignate Salt | 1.09 ± 0.16 | 0.76 ± 0.13 | 0.54 ± 0.13 | 47 |
| Test II | 0.7 Lignate Salt | 1.10 ± 0.27 | 0.76 ± 0.16 | 0.54 ± 0.14 | 47 |
| Test III | 0.5 Lignate Salt | 1.25 ± 0.15 | 0.80 ± 0.10 | 0.61 ± 0.08 | 63 |

As can be seen from Table I, the fertilizers of the present invention exhibit a resistance to compression which is superior to that of either of the known fertilizer compositions In addition to the foregoing, the resistance to impact was measured in accordance with IFDC-118 Standard and the results are again shown hereinbelow in Table II.

TABLE II

| ADDITIVE | QUANTITY OF ADDITIVE IN THE UREA wt. % | RESISTANCE TO IMPACT PRILLS FRACTURED wt. % | INCREASE OF RESISTANCE TO IMPACT wt. % |
|---|---|---|---|
| NONE | WITHOUT ADDITIVE | 6.7 ± 0.1 | — |
| UF85 | 0.3 | 1.2 ± 0.7 | 82 |
| Norlig-HP | 0.5 | 2.4 ± 0.7 | 64 |
| Test I | 0.5 Lignate Salt | 0.6 ± 0.4 | 91 |
| Test II | 0.7 Lignate Salt | 1.9 ± 0.7 | 72 |
| Test III | 0.5 Lignate Salt | 2.9 ± 0.7 | 57 |

As can be seen from Table II, the resistance to impact of the fertilizer compositions of the present invention are comparable to those obtained by the known fertilizer compositions.

EXAMPLE II

The fertilizers employed in Example I were subjected to caking tests in accordance with the procedure described above and the results of these caking tests are shown in Table III hereinbelow.

TABLE III

| ADDITIVE | QUANTITY OF ADDITIVE IN THE UREA wt. % | RESISTANCE OF THE CAKES Kg | REDUCTION OF CAKING wt. % |
|---|---|---|---|
| NONE | WITHOUT ADDITIVE | 12.2 ± 0.3 | — |
| UF85 | 0.3 | 6.3 ± 1.2 | 48 |
| Norlig-HP | 0.5 | 2.8 ± 1.3 | 77 |
| Test I | 0.5 Lignate Salt | 5.6 ± 1.4 | 54 |
| Test II | 0.7 Lignate Salt | 3.9 ± 0.9 | 68 |
| Test III | 0.5 Lignate Salt | 3.9 ± 1.0 | 68 |

Again, it can be seen that the caking tendencies of the fertilizer compositions of the present invention are at worst comparable to and in many cases better than the caking tendencies of the known fertilizer compositions.

EXAMPLE III

In order to demonstrate the effectiveness of other compositions of the fertilizer of the present invention, a sodium lignate powder was mixed with nitrogen-potassium-phosphorus granulates having a formula of 15-15-15-solid so as to produce a final lignate composition of 5 wt. %. A second formulation was made by mixing a nitrogen-potassium-phosphorus granulate having the formula 13-26-06 with sodium lignates so as to obtain a final composition of 2.8 wt. % lignate. Caking tests were again run in order to compare the effect of the additive of the present invention on those fertilizer compositions and those results are given hereinbelow in Table IV.

TABLE IV

| TYPE OF FERTILIZER | LIGNATE wt. % | RESISTANCE OF THE CAKES Kg wt. % | REDUCTION OF CAKING wt. % |
|---|---|---|---|
| 13-26-06 | 0.0 | 12.5 ± 1.0 | — |
|  | 2.8 | 7.5 ± 1.1 | 40 |
| 15-15-15 | 0.0 | 14.6 ± 0.4 | — |
|  | 5.0 | 7.2 ± 0.7 | 51 |

It can be seen from Table 4 that the additive compound of a lignate salt in accordance with the present invention greatly reduces the caking tendencies of known fertilizers.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A fertilizer composition characterized by high mechanical resistance and anti-caking properties comprising:
    (a) a compound selected from the group consisting of urea, ammonium sulphate, nitrogen-potassium-phosphorus granulates, mono-ammonic phosphate, di-ammonic phosphate, potassium chloride and mixtures thereof; and
    (b) a hydrosoluble lignate salt selected from the group consisting of sodium lignates, alkaline metal lignates, ammonium lignates, and mixtures thereof in an amount of between 0.1 to 5.0 wt. % in the final fertilizer composition such that said fertilizer formula possesses a high mechanical resistance and a low tendency to lumping without affecting the capacity of dissolution thereof.

2. A fertilizer according to claim 1 wherein said hydrosoluble lignate salt is a sulphur free sodium lignate.

3. A fertilizer according to claim 1 wherein the compound is urea and the hydrosoluble lignate salt is present in an amount of between 0.1 to 1.0 wt. % in the final fertilizer composition.

4. A fertilizer according to claim 1 wherein the compound is ammonium sulphate and the hydrosoluble lignate salt is present in an amount of between 2.6 to 4.8 wt. % in the final fertilizer composition.

5. A method for producing a fertilizer characterized by improved high mechanical resistance and anti-caking properties comprising the steps of:
    (a) providing a compound selected from the group consisting of urea, ammonium sulphate, nitrogen-potassium-phosphorus granulates, mono-ammonic phosphate, di-ammonic phosphate, potassium chloride and mixtures thereof;
    (b) adding to said compound a hydrosoluble lignate salt selected from the group consisting of sodium lignates, alkaline metal lignates, ammonium lignates, and mixtures thereof in an amount of between 0.1 to 5.0 wt. % in the final fertilizer composition;
    (c) mixing said compound and said lignate salt so as to produce a homogeneous mixture thereof; and
    (d) processing said mixture so as to obtain a desired particulate material form.

6. A method according to claim 5 including providing a sulphur free sodium lignate as said lignate salt.

7. A method according to claim 5 including the steps of heating the mixture of compound and lignate salt prior to processing to desired particulate material form.

8. A method according to claim 5 including the step of processing a "soda liquor" to obtain said ignate salt.

9. A method according to claim 8 where said "soda liquor" is the waste liquor from treating sugar cane bagasse with sodium hidroxide for obtaining paper pulp.

* * * * *